Sept. 6, 1966 B. M. SOSIN 3,271,683

PLURAL HYBRID LOAD COUPLING ARRANGEMENT FOR PLURAL TRANSMITTERS WITH OUTPUTS IN PHASE QUADRATURE

Filed July 12, 1963

INVENTOR
Boleslaw Marian Sosin
BY
Baldwin & Wight
ATTORNEYS 3,271,683

PLURAL HYBRID LOAD COUPLING ARRANGEMENT FOR PLURAL TRANSMITTERS WITH OUTPUTS IN PHASE QUADRATURE

Boleslaw Marian Sosin, Great Baddow, England, assignor to The Marconi's Company Limited, a British company Filed July 12, 1963, Ser. No. 294,663
Claims priority, application Great Britain, July 17, 1962, 27,331/62
4 Claims. (Cl. 325—130)

This invention relates to transmitter-load coupling arrangements and has for its object to provide improved and simple coupling arrangements whereby the outputs of a number of transmitters operating on different frequencies may be supplied to a common load, usually (though not necessarily) an aerial. Though not limited to its application thereto the invention is particularly advantageous for and was originally conceived for use in coupling the vision and accompanying sound transmitters of a television broadcast station to a common broadcasting aerial.

The vision and accompanying sound transmitters of a television broadcasting station operate, of course, on different but adjacent carrier frequencies. This fact leads to difficulties in providing economical and satisfactory means for coupling them to a common transmitting aerial installation. In present day practice one or other of two methods is usually employed. In one method the aerial is divided into two parts which are fed from the transmitters via a diplexer (hybrid) and two long feeders. This method has the defect of more or less seriously restricting the aerial design, for not all designs of aerial are suitable for such division into parts. It also has the defect of being expensive, for the necessity of providing two long feeders running up the aerial mast adds considerably to the cost. The second method employs sharply tuned combining filters for feeding the transmitter outputs to the aerial. Such combining filters are expensive, difficult to design and tend adversely to rectrict the vision bandwith. The present invention seeks to provide improved coupling arrangements which avoid the foregoing defects.

According to this invention an arrangement wherein a plurality of transmitters of different frequencies are coupled to a common load comprises a plurality of four-port hybrids in cascade between said common load and a balancing load and each having one of its ports connected to a port of the next hybrid in the cascade sequence, and a plurality of transmitters each having two output terminals on which appear signals in phase quadrature relation with respect to one another. The transmitter output signals are fed into the two remaining ports of a corresponding one of the hybrids through circuits tuned to the transmitter frequency, the lengths between said output terminals and said two remaining ports being so chosen in relation to one another that the energies fed in at said two remaining ports combine additively at the port leading to the common load.

According to a feature of this invention an arrangement wherein two transmitters of different frequencies are coupled to a common aerial comprises two four-port hybrids each having one port connected to a port of the other, an aerial connected to a remaining port of one hybrid, a balancing load connected to a remaining port of the other hybrid, and two transmitters of different frequencies each having two output terminals on which appear signals in phase quadrature relation with respect to one another. The transmitter output signals are fed into the two remaining ports of a corresponding one of the hybrids through circuits tuned to its own frequency, the lengths between said output terminals and said two remaining ports being so chosen in relation to one another that the energies fed in at said two remaining ports combine additively at the port leading to the common load.

Either of two types of hybrid may be employed namely what is herein termed the quadrature type and what is herein termed the in-phase type. By "quadrature type" is meant that type in which two inputs in phase quadrature combine additively at an output port. Examples of this type are the H-line hybrid and the 3 db directional coupler. By "in-phase type" is meant that type in which two inputs which are either in phase with one another or are in phase opposition to one another combine additively at an output port. Examples of this type are the rat race and the conjugate coil hybrid. If an in-phase type of hybrid is used the path lengths between the output terminals of a transmitter and the aforesaid two remaining ports of the appropriate hybrid must differ by ¼ wavelength or an odd multiple thereof. If the quadrature type of hybrid is employed said path lengths must be the same or differ by ½ wavelength or a multiple thereof. In the case of the said path length differing by ½ wavelength it will, of course, be necessary to interchange the connections of the output ports of the appropriate hybrid. As will be seen, hybrids suitable for use in carrying out the present invention have two pairs of ports, each pair being balanced. As is well known, such hybrids are reversible in that input signals may be applied to one pair of ports while output signals are taken from the other pair or vice versa.

The invention is illustrated in the accompanying drawing in which.

Figure 2:
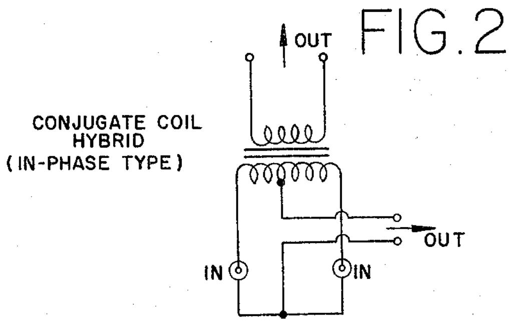
FIGURE 2 shows a conjugate coil hybrid, a pair of which may be substituted for the H-line hybrids of FIGURE 1.
Figure 1:
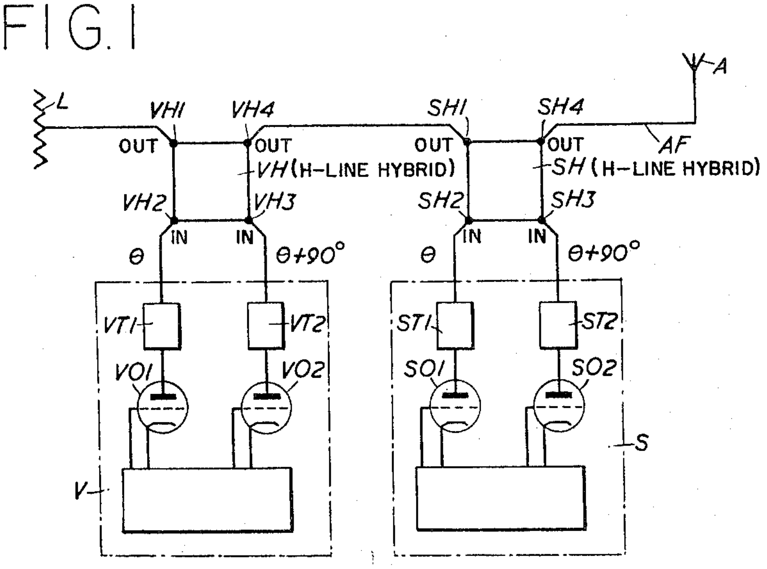
FIGURE 1 is a simplified schematic diagram of the invention illustrating the invention as practiced with H-line hybrids.
Figure 3:
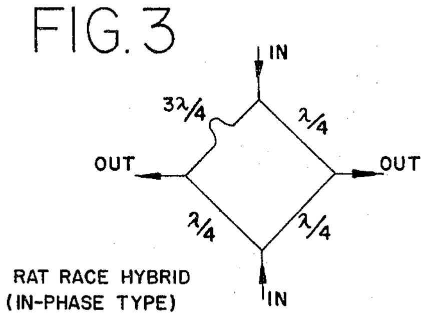
FIGURE 3 illustrates a rat race hybrid, a pair of which may be substituted for the H-line hybrids of FIGURE 1; and, FIGURE 4 sets forth a 3 decibel directional coupler, a pair of which may be employed in the practice of the invention of the FIGURE 1 in place of the H-line hybrids.
Figure 4:
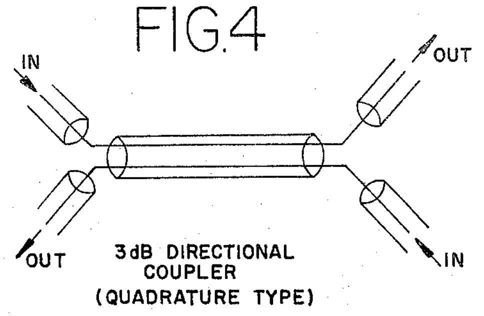

The accompanying drawing is of a television transmitting station comprising a vision transmitter represented within the chain-line block V and an accompanying sound transmitter represented within the chain-line block S. The two transmitters operate, in the customary fashion, on different but adjacent carrier frequencies. Each has two output valves VO1, VO2 or SO1, SO2 with carrier frequency tuned anode circuits VT1, VT2 or ST1 , ST2, the circuits VT1, VT2 being, of course, tuned to the vision carrier and the circuits ST1, ST2 being tuned to the sound carrier.

The transmitter V feeds its two outputs to the two input ports VH2, VH3 of a hybrid VH and the transmitter S feeds its two outputs to the two input ports SH2, SH3 of a hybrid SH. The hybrids are shown as H-line hybrids and are therefore of the quadrature type. The output terminals of the transmitters are the anodes of the valves and each transmitter is so arranged and operated that its two valve anodes are in phase quadrature. Because the hybrids are of the quadrature type, the path lengths from the terminals of each transmitter to the associated input hybrid ports are the same (they could differ by ½ wavelength or a multiple thereof) so that the inputs at those ports are also in quadrature. This is conventionally indicated in the drawing by the legends "$\theta$" and "$\theta+90°$." The hybrids are in cascade, the output port VH4 of hybrid VH being connected to the output port SH1 of output hybrid SH. The two remaining hybrid ports, SH4 of hybrid SH and VH1 of hybrid VH are connected respectively to a transmitting aerial A and a balancing load L.

Power output from transmitter S is delivered directly over the single aerial feeder AF to the aerial A and unbalance power and power reflected from the aerial—both of which will in practice be small—will pass to the balancing load L in which will also appear unbalance power from transmitter V. Power output from transmitter V will pass to the aerial via transmitter S. This power from the transmitter V to the aerial via the transmitter S will, of course, not be relatively small. On entering hybrid SH it will be divided and sent towards the valves SO1, SO2 and, after reflection, will be diverted back to the hybrid SH but in such phase relation that power addition will occur at the output port SH4 of hybrid SH. However, the interference due to power from the transmitter V entering the hybrid SH is in fact extremely small. The anode tuning circuits ST1 and ST2 prevent unduly high voltages being induced on the anodes of the output valves SO1 and SO2 because, in each transmitter, power is concentrated at frequencies near its own carrier. Such tuned circuits ST1 and ST2 are practically lossless and therefore possess highly reflective properties and in practice largely prevent the output of the transmitter V from interfering with the operation of valves SO1 and SO2. Thus, the power of the transmitter V is concentrated at frequencies near the vision carrier and these frequencies are sufficiently remote from the sound carrier to permit satisfactory filtering by the sound carrier tuned anode circuits ST1 and ST2 which, like the vision carrier tuned anode circuits, VT1 and VT2 are of normal design. Such tuned circuits do not affect vision bandwidth as would be the case were sharply tuned combining filters employed, and vision side-bands right up to or even beyond the sound carrier will be transmitted.

Provided each transmitter provides output signals having the specified phase relationship with one another, which signals are then fed to hybrids having the interconnections specified, then the surprising and valuable result is obtained of combining two transmitters' outputs of different frequencies into one load by means of simple and inexpensive hybrid arrangements. The properties of such hybrid arrangements would of course be well known to one ordinarily skilled in the art.

The main application of the invention is, in practice, to relatively low power transmitters. Its application is obviously not limited to the coupling of vision and sound transmitters to a common aerial: thus, for example, in a colour television transmitter the invention might be employed to add the output of a colour sub-carrier transmitter to the output from a monochrome transmitter.

I claim:

1. A circuit for coupling a plurality of transmitters of different frequencies to a common load, said circuit comprising a plurality of four-port hybrids each having two pairs of ports, one pair of ports of each hybrid being coupled in cascade between said common load and a balancing load and each hybrid having one of said ports connected to a corresponding port of the next hybrid in the cascade sequence, and a plurality of transmitters each having two output terminals on which appear output signals in phase quadrature relation with respect to one another, said output signals being fed into the two remaining ports of a corresponding hybrid through circuits tuned to the corresponding output signal frequency, the means coupling said output terminals to said two remaining ports being so chosen in relation to one another that the signals fed in at said two remaining ports combine additively at the port leading to the common load.

2. A circuit as claimed in claim 1 including a hybrid of the in-phase type, said output signals being coupled to said hybrid ports by means of conductors, and the conductor path lengths between the output terminals of the transmitter connected to said hybrid and the aforesaid two remaining ports of said hybrid differing by ¼ wavelength or an odd multiple thereof.

3. A circuit as claimed in claim 1 including a hybrid of the quadrature type, said output signals being coupled to said hybrid ports by means of conductors, and the conductor path lengths between the output terminals of the transmitter connected to said hybrid and the aforesaid two remaining ports of said hybrid being equal or differing by ½ wavelength or a multiple thereof.

4. A circuit for coupling two transmitters of different frequencies to a common aerial, said arrangement comprising two four-port hybrids each having two pairs of ports, one pair of ports of each hybrid being coupled in cascade between a common aerial and a common balancing load, and two transmitters of different frequencies each having two output terminals on which appear output signals in phase quadrature relation with respect to one another, said output signals being fed into the two remaining ports of a corresponding hybrid through circuits tuned to the corresponding output signal frequency, the means coupling said output terminals to said two remaining ports being so chosen in relation to one another that the signals fed in at said two remaining ports combine additively at the port leading to the common aerial.

References Cited by the Examiner

UNITED STATES PATENTS

| | | | |
|---|---|---|---|
| 2,602,887 | 7/1952 | Brown | 325—128 |
| 2,840,696 | 6/1958 | Beck et al. | 325—129 |

FOREIGN PATENTS

| | | |
|---|---|---|
| 1,096,437 | 9/1961 | Germany. |

DAVID G. REDINBAUGH, *Primary Examiner.*

B. V. SAFOUREK, *Assistant Examiner.*